(12) United States Patent
Kai et al.

(10) Patent No.: US 7,446,727 B2
(45) Date of Patent: Nov. 4, 2008

(54) CROSS DIPOLE ANTENNA AND TAG USING THE SAME

(75) Inventors: Manabu Kai, Kawasaki (JP); Toru Maniwa, Kawasaki (JP); Takashi Yamagajo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 61 days.

(21) Appl. No.: 11/605,284

(22) Filed: Nov. 29, 2006

(65) Prior Publication Data

US 2007/0279311 A1 Dec. 6, 2007

(30) Foreign Application Priority Data

May 30, 2006 (JP) .............................. 2006-149987

(51) Int. Cl.
*H01Q 21/26* (2006.01)
(52) U.S. Cl. ..................... 343/797; 343/795; 340/572.7
(58) Field of Classification Search ................. 343/795, 343/797, 700 MS; 340/572.1, 572.7
See application file for complete search history.

(56) References Cited

U.S. PATENT DOCUMENTS

| | | | |
|---|---|---|---|
| 4,668,956 A | | 5/1987 | Mahnad |
| 4,922,263 A | * | 5/1990 | Dubost et al. ............... 343/797 |
| 5,280,286 A | * | 1/1994 | Williamson .................. 342/44 |
| 5,691,734 A | * | 11/1997 | Davies ....................... 343/795 |
| 6,028,563 A | * | 2/2000 | Higgins ...................... 343/797 |
| 6,078,259 A | | 6/2000 | Brady et al. |
| 6,459,415 B1 | | 10/2002 | Pachal et al. |
| 6,888,510 B2 | * | 5/2005 | Jo et al. ...................... 343/797 |

FOREIGN PATENT DOCUMENTS

| GB | 2 347 792 | 9/2000 |
|---|---|---|
| WO | WO 01/80358 | 10/2001 |

OTHER PUBLICATIONS

Pavel V. Nikitin, et al., Low Cost Silver Ink RFID Tag Antennas, Antennas and Propagation International symposium, 2005 IEEE vol. 2B, 3-8 pp. 353-356, Jul. 2005.
Morishita H., et al: "A wideband circularly polarize dipole antenna"; Antennas and Propagation Society International Symposium, 1998. IEEE Atlanta, GA, USA; 21-26; Jun. 1998; New York, NY, USA, IEEE, US vol. 4, Jun. 21, 1998, pp. 2348-2350, XP010292180; ISBN: 0-7803-4478-2; *the whole document*.

* cited by examiner

*Primary Examiner*—Tan Ho
(74) *Attorney, Agent, or Firm*—Hanify & King, P.C.

(57) ABSTRACT

A compact antenna structure having substantially no directivity independent of a tag direction in an RFID tag is proposed. The antenna structure includes a pair of dipole antennas is provided in a cross dipole antenna to be applied to an RFID system for communicating information between a reader/writer and the tag using a high-frequency radio signal. The above pair of dipole antennas further includes lines extending from a feed point and mutually intersecting crosswise, and also triangularly expanded lines from the bent ends of the above lines. Each total length of the above pair of dipole antennas is longer than $2/\lambda$ of a use frequency $\lambda$.

11 Claims, 9 Drawing Sheets

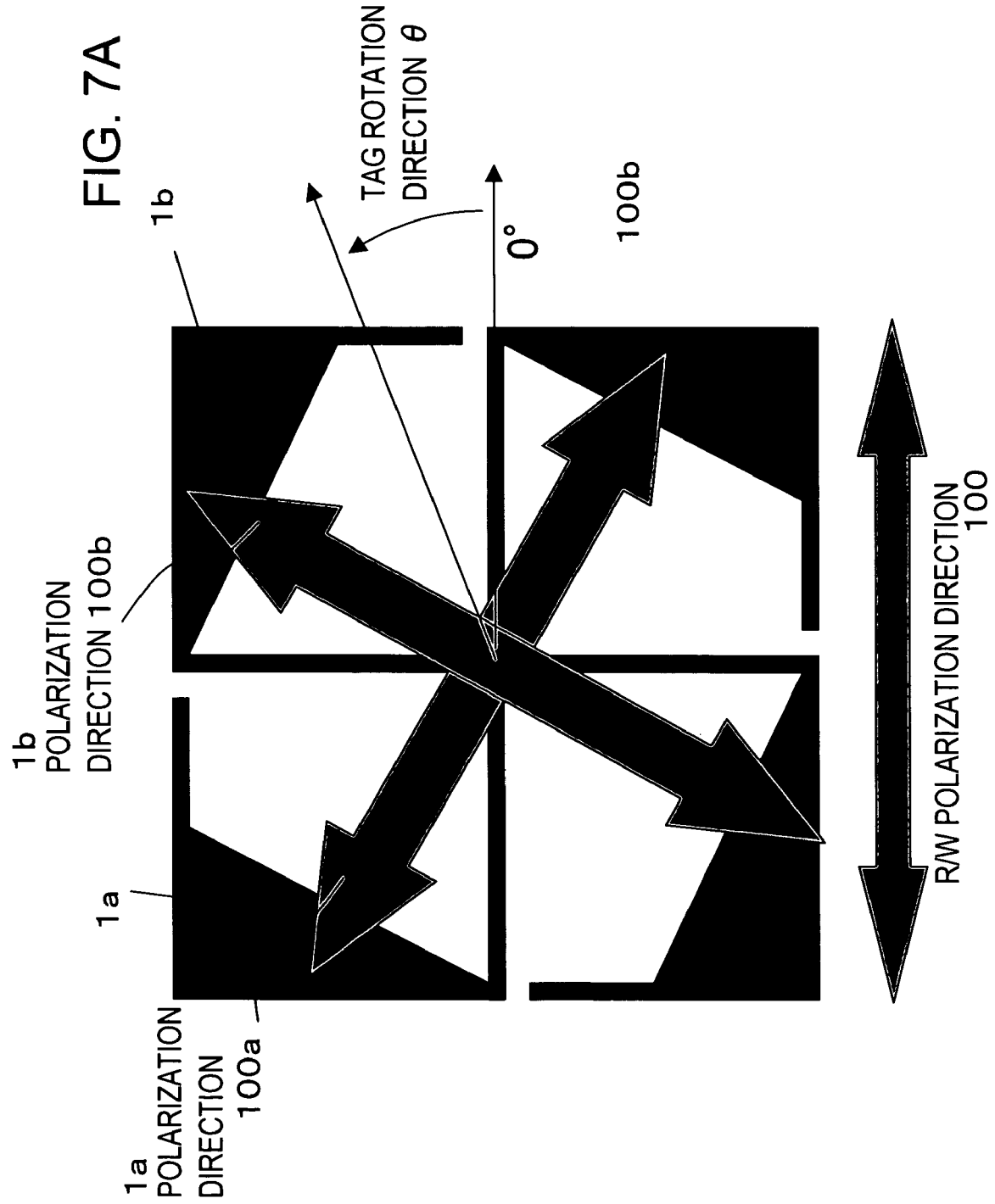

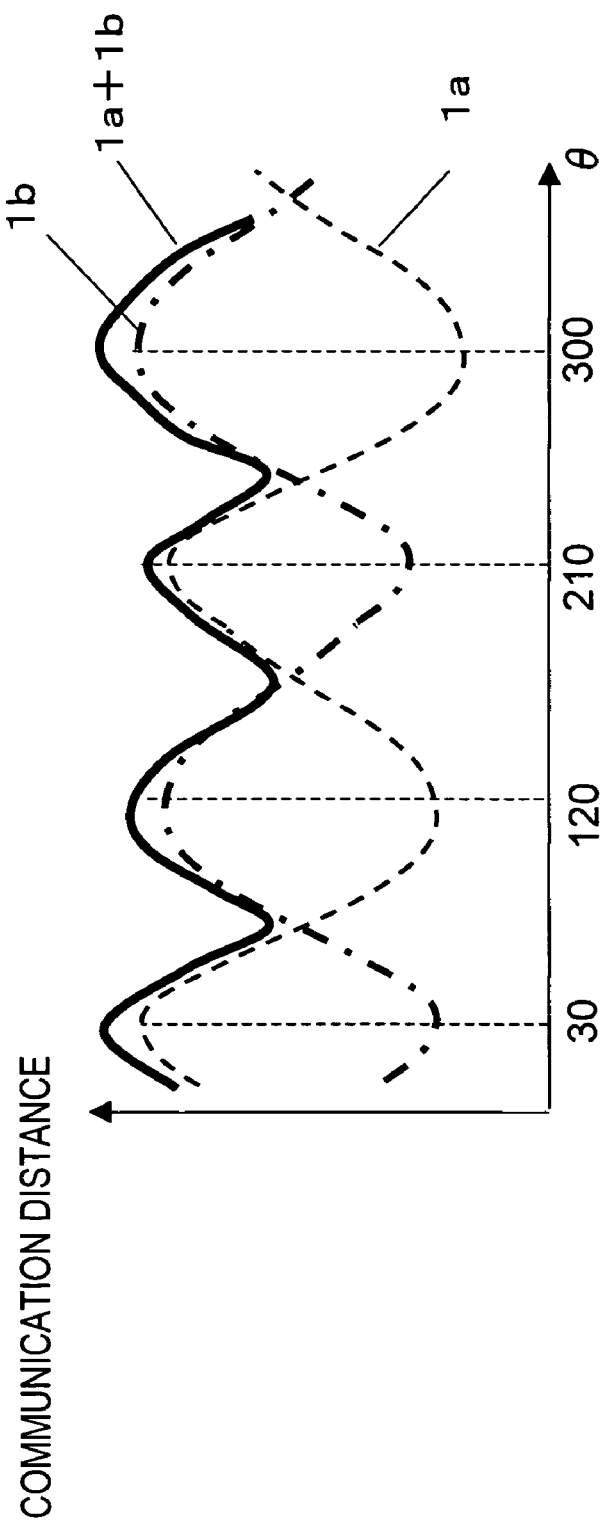

CROSS DIPOLE ANTENNA AND TAG USING THE SAME

CROSS-REFERENCE TO RELATED APPLICATIONS

This application is based upon and claims the benefit of priority from the prior Japanese Patent Application No. 2006-149987, filed on May 30, 2006, the entire contents of which are incorporated herein by reference.

BACKGROUND OF THE INVENTION

1. Field of the Invention

The present invention relates to a cross dipole antenna to be applied to an RFID (radio frequency identification) system for communicating information between a reader/writer and a tag using a high-frequency radio signal, and a tag using the same.

2. Description of the Related Art

In the RFID (radio frequency identification) system, a carrier wave signal of approximately 1 W is transmitted from a reader/writer by use of a radio frequency signal in the UHF band (860-960 MHz). The tag side receives the above carrier wave signal, and modulates the above carrier wave signal with tag information. The modulated signal is returned to the reader/writer side as a response signal, and the information in the tag is read by the reader/writer. Application fields of such the RFID system are spreading now.

The communication distance in the above system ranges approximately 3-5 meters, although depending on an antenna gain provided in the tag, an operating voltage of an LSI chip for signal processing, and also a surrounding environment. The tag is constituted of an antenna pattern of conductive material, being formed on a base body such as a sheet and a film having a thickness of the order of 0.1 mm, and an LSI chip (approximately 1 mm square with a thickness of 0.2 mm or so) connected to an antenna feed point.

As shown in FIG. 1, an LSI chip 2 can be expressed equivalently by a parallel connection of a resistance Rc (500Ω as an example) and a capacitance Cc (1.4 pF as an example). Meanwhile, a tag antenna 1 can be expressed equivalently by a parallel connection of a radiation resistance Ra (400Ω as an example), and an inductance La (20 nH as an example).

By connecting the above LSI chip 2 and tag antenna 1 in parallel, the capacitance resonates with the inductance, resulting in matching at a desired resonant frequency f0, as can be understood from formula 1 shown below. Hence, it follows that the receiving power in antenna 1 is sufficiently supplied to the chip 2 side.

$$f0 = 1/2\pi\sqrt{LC} \qquad \text{(formula 1)}$$

Now, in FIG. 2A, a basic configuration of the dipole antenna is shown. Since an overall antenna length is set to $\lambda/2$ of a use frequency, in case of 953 MHz, the overall antenna length is a $\lambda/2$ wavelength, which equals approximately 145 mm. LSI chip 2 is connected at a feed point of each antenna element having a length of $\lambda/4$.

By setting the overall antenna length to $\lambda/2$, the antenna resonates at 953 MHz. However, there is no La component shown in FIG. 1. Therefore, as shown in FIG. 2B, by setting the length to 180 mm or of that order, which is longer than $\lambda/2$, antenna 1 comes to have an La component, and thus it becomes possible to make antenna 1 resonate with LSI chip 2.

As such a dipole antenna formed on an RFID tag, it has been known to make the antenna length longer than $\lambda/2$, for example, in the publication, "Antennas and Propagation International symposium", 2005 IEEE Volume 2B, 3-8 pages 353-356, July 2005.

Further, since the polarization of the above tag antenna 1 is linear, usually, circular polarization is used for a non-illustrated antenna on the reader/writer (R/W) side, so as to enable transmission and reception at a substantially identical distance even when the tag is rotated in a plane parallel to a paper plane. Namely, assuming to use a linear polarization antenna on the R/W side, when the polarization direction thereof coincides with a tag polarization direction, the communication distance becomes longer by approximately 1.4 times, as compared to the a case of using circular polarization. In contrast, the communication distance becomes drastically decreased when the polarization direction of the R/W antenna is placed perpendicular to the tag polarization direction.

Now, an ordinary chip has two terminals as shown in FIG. 1. Furthermore, by connecting the two systems in parallel, a chip having four terminals is also put into the commercial market today, as shown in FIG. 3. In many such cases, the grounding sides (GND) are mutually connected in a direct current (DC) manner. Therefore, for example, by configuring the antenna with two systems of cross structure using dipole antennas shown in FIG. 1, it becomes possible to maintain the communication distance long even when a linear polarization antenna is used on the R/W side. However, the vertical and horizontal lengths come to 180 mm, respectively. Such an antenna is too big for a tag antenna of practical use.

SUMMARY OF THE INVENTION

Considering the above-mentioned point, it is an object of the present invention to provide a compact antenna structure having substantially no directivity independent of tag direction, even when linear polarization antenna is used on the R/W side, and to provide a tag to which the above-mentioned antenna structure is applied.

In a first aspect according to the present invention to achieve the aforementioned object, a cross dipole antenna to be applied to an RFID system communicating information between a reader/writer and a tag using a high-frequency radio signal is disclosed. The cross dipole antenna includes a pair of dipole antennas, and the pair of dipole antennas further includes lines extending from a feed point of the pair of dipole antennas mutually intersecting crosswise, and ahead of the bent ends of the lines, triangularly expanded lines. Further, each total length of the pair of dipole antennas is longer than $2/\lambda$ of a use frequency $\lambda$.

In the above-mentioned first aspect, the cross dipole antenna further includes extension portions disposed ahead of the respective end portions of the triangularly expanded lines of the pair of dipole antennas, and the impedance may be adjusted depending on the lengths of the above extension portions.

Further, the lengths of the above extension portions may be set according to the dielectric constant and the thickness of the base body having the pair of dipole antennas pasted thereon.

In the above-mentioned first aspect, the cross dipole antenna further includes a conductive bar connected to the respective lines extending from the feed point of the pair of dipole antennas, and it may also be possible to adjust the impedance depending on the connection position of the conductive bar to the lines extending from the feed point.

Further, in the above-mentioned first aspect, the triangle shape may be formed of a peripheral contour portion of a conductor the central portion of which is hollowed.

In a second aspect according to the present invention to achieve the aforementioned object, a tag to be applied to an RFID system communicating information between a reader/writer and the tag using a high-frequency radio signal is disclosed. The tag includes a base body, a pair of dipole antennas formed of conductors on the base body, and an LSI chip connected to a feed point of the pair of dipole antennas mutually intersecting crosswise. The above pair of dipole antennas further includes: lines extending from a feed point of the pair of dipole antennas mutually intersecting crosswise; and ahead of the bent ends of the lines, triangularly expanded lines, and each total length of the pair of dipole antennas is longer than $2/\lambda$ of a use frequency $\lambda$.

In the above second aspect, the base body is formed of PET, film or paper material, and the conductors of the dipole antennas are formed of Cu, Ag or Al.

According to the present invention, even in case that the linear polarization antenna is used on the R/W side, there is provided a compact dipole antenna having substantially no directivity independent of the tag direction. With this, it becomes possible to avoid the tag having a large size.

Further scopes and features of the present invention will become more apparent by the following description of the embodiments with the accompanied drawings.

BRIEF DESCRIPTION OF THE DRAWINGS

FIG. 7A shows tag operation in case linear polarization 100 is used for a R/W antenna.

FIG. 7B shows a diagram illustrating relationship between a tag rotation angle and a communication distance in FIG. 7A.

DETAILED DESCRIPTION OF THE PREFERRED EMBODIMENTS

The preferred embodiment of the present invention is described hereinafter referring to the charts and drawings. However, it is to be noted that the technical scope of the present invention is not limited to the embodiments described below.

Figure 4:
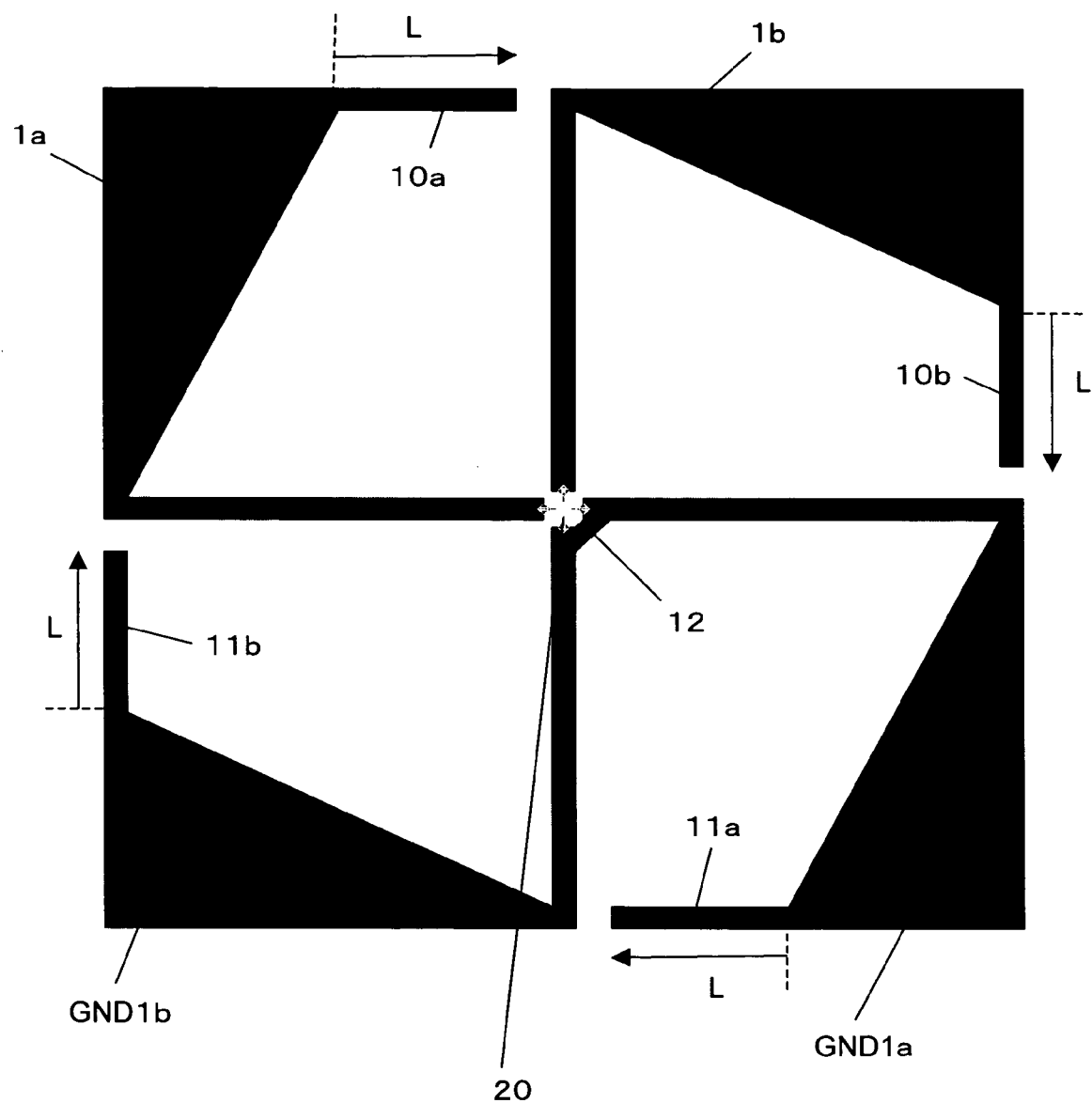
FIG. 4 shows an antenna pattern according to a first embodiment of the present invention.

In FIG. 4, an antenna pattern structure according to a first embodiment of the present invention is shown. The antenna pattern is formed using a conductive material of Cu, Ag, Al, or the like, on PET, film or paper material constituting a base body of a tag.

Figure 3:
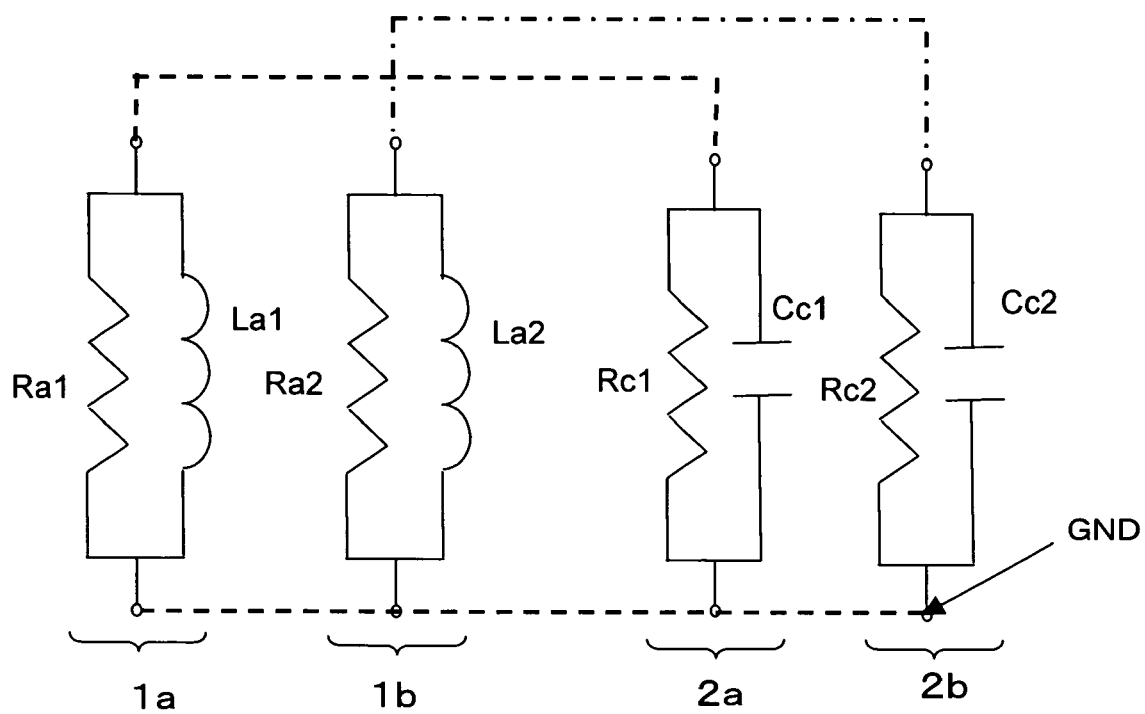
FIG. 3 shows an explanation diagram of an LSI chip equivalently represented by the inclusion of four terminals by connecting two systems in parallel.

A pair of dipole antennas $1a$, $1b$ is connected in parallel at a feed point 20. As shown in FIG. 3, antenna elements GND$1a$, GND$1b$ on the grounding side respectively corresponding to the dipole antennas $1a$, $1b$ are connected in common by means of a conductor 12.

In the pair of dipole antennas $1a$, $1b$, antenna lines extend in a cross shape from the feed point 20. At the end of the above antenna lines, the lines are bent with a right angle. Further, lines are expanded in a triangle shape. The overall sizes of the antenna pattern are 78 mm vertically and 78 mm horizontally. At feed point 20 locating at the center position of the cross shape, there is provided a mount portion of an LSI chip 2.

Depending on the above-mentioned triangularly expanded lines, a variety of total antenna lengths can be set, and thereby the antenna frequency characteristic can be broadened.

Figure 1:
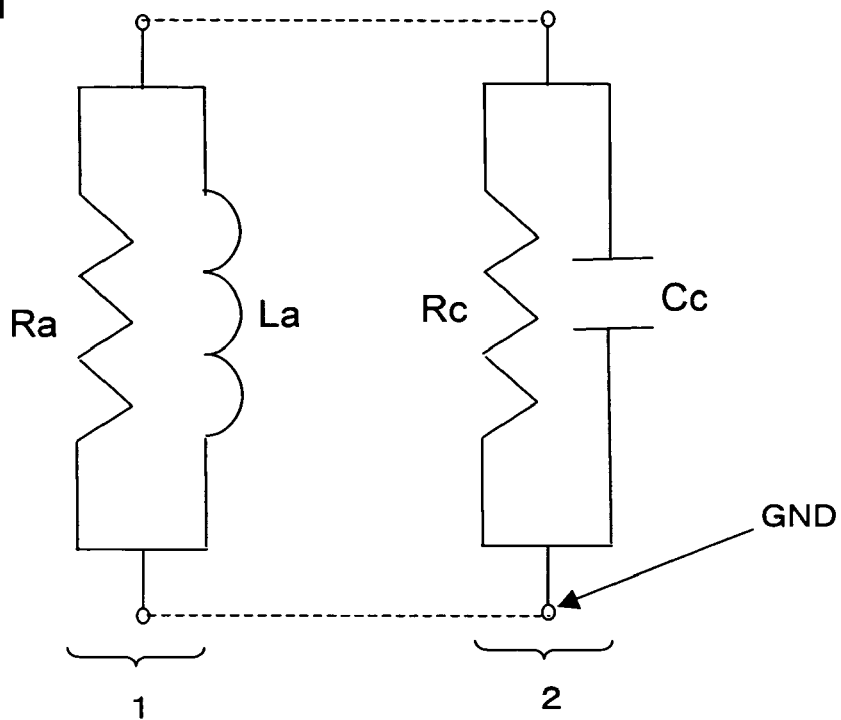
FIG. 1 shows an explanation diagram of an LSI chip equivalently represented by a parallel connection of resistance Rc and capacitance Cc.
Figure 2A:
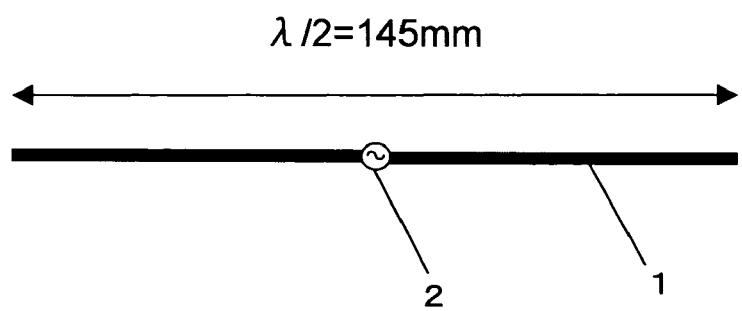
FIG. 2A shows a diagram illustrating a basic dipole antenna.
Figure 2B:
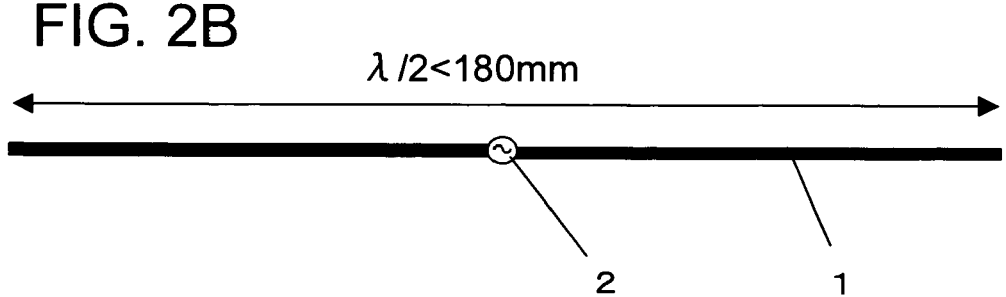
FIG. 2B shows a diagram illustrating a dipole antenna having a length longer than $\lambda/2$ and having an inductor component La.

In the above configuration, because antennas $1a$, $1b$ exist crosswise, and each total length is approximately 180 mm ($>\lambda/2$), it becomes possible to have an inductance component La, as illustrated before with respect to FIG. 2B.

Further, in the embodiment shown in FIG. 4, there are provided impedance adjustment portions $10a$, $10b$ and $11a$, $11b$, each having a length L, extending from each end of the triangular areas.

Figure 5:
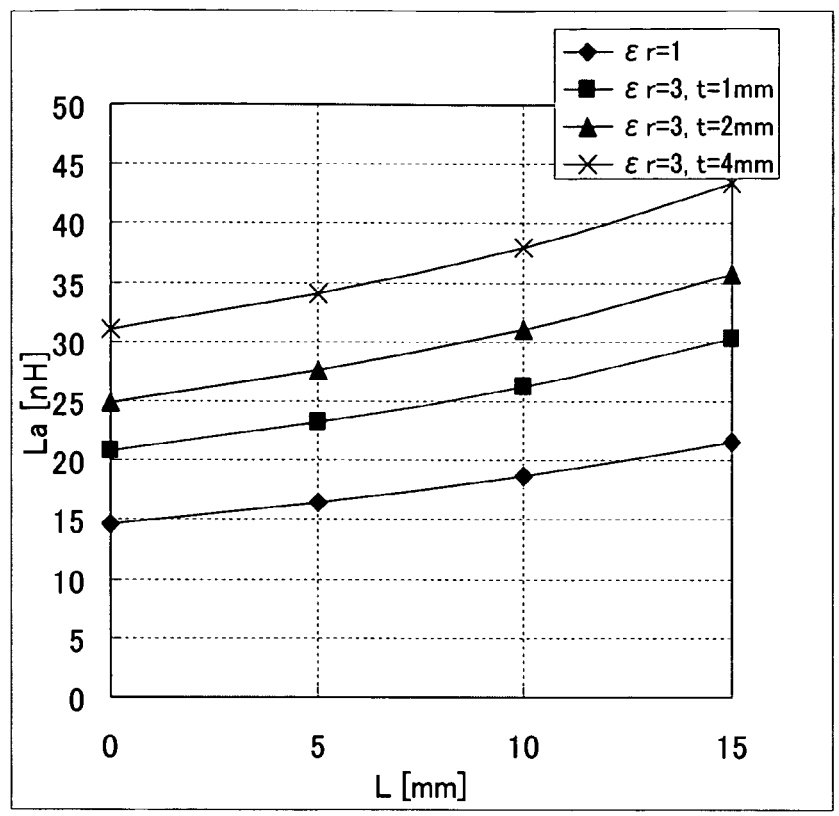
FIG. 5 shows a diagram illustrating a calculation result of an inductance component La with a parameter of the length L of an impedance adjustment portion, using a commercially sold electromagnetic field simulator.
Figure 6:
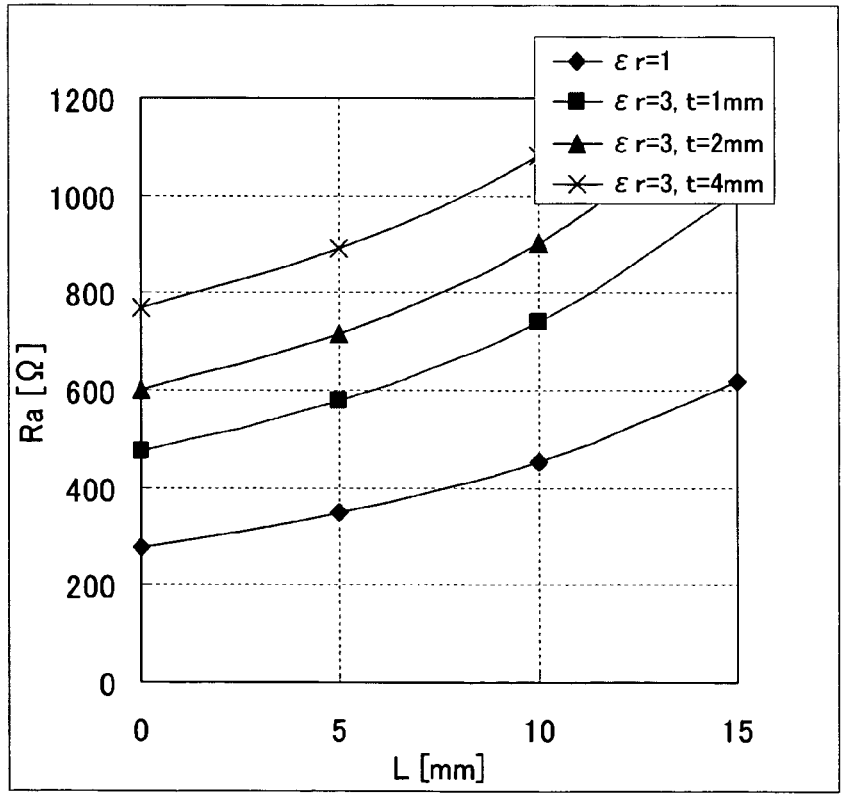
FIG. 6 shows a diagram illustrating a calculation result of an antenna radiation resistance Ra, with a parameter of the length L of an impedance adjustment portion, using a commercially sold electromagnetic field simulator.

FIGS. 5 and 6 show diagrams illustrating calculation results of an inductance component La and an antenna radiation resistance Ra, with a parameter of the length L of impedance adjustment portions $10a$, $10b$ and $11a$, $11b$, using a commercially sold electromagnetic field simulator.

Here, in regard to the tag to be used in the RFID system, since the tag is used by pasting an antenna conductor onto the base body, desirably, a dielectric constant $\epsilon r$ and a thickness t of the base body are taken into consideration. Therefore, in the simulation calculation shown in FIGS. 5 and 6, the tag base body is considered to be plastic, and $\epsilon r=3$ and the thickness $t=1$, 2 and 4 mm are assumed.

For example, assuming that the capacitance Cc of LSI chip 2 is 1.4 pF, to resonate with the above capacitance, La comes to be 20 nH. From the data shown in FIG. 5, an optimum value L=0 when pasted on a plastic base body having a thickness $t=1$ mm ($\epsilon r=3$), or L=13 mm when hung by a string to produce an antenna ambience of air ($\epsilon r=1$). At this time, as shown in FIG. 6, the antenna radiation resistance Ra comes to near a chip resistance 500$\Omega$, which matches substantially.

Additionally, even without selecting such an optimum value corresponding to the ambient condition, it does not mean that the communication becomes entirely disabled, but only the communication distance is degraded to some extent.

FIGS. 7A and 7B show tag operation in case a linearly polarized wave 100 is used for the R/W antenna. In FIG. 7A, the polarization plane $100a$ of antenna $1a$ lies in the direction rotated by approximately 30 degrees from the left and right directions (horizontal direction), while the polarization plane of antenna $1b$ differs by 90 degrees therefrom.

When linear polarization plane 100 of the R/W antenna coincides with the tag polarization plane, the communication distance becomes maximum, while when the above planes differ by 90 degrees, the communication distance becomes minimum. Accordingly, when attention is paid only to antenna 1a, if the tag is rotated 30 degrees counterclockwise, linear polarization plane 100 of the R/W antenna coincides with tag polarization plane 100a, and thereby a maximum communication distance is obtained. If the tag is rotated further by 90 degrees, at the rotation position of 120°, the communication distance becomes minimum. Such the state is shown with a broken line 1a in FIG. 7B. In this FIG. 7B, the horizontal axis shows the rotation angle, while the vertical axis shows the communication distance.

On the other hand, when attention is paid to antenna 1b, there is a phase difference of 90° from antenna 1a. In FIG. 7B, the relationship between the rotation angle and the communication distance is shown with a one-dot chain line 1b. Accordingly, in the composite characteristics of antennas 1a and 1b, it is understood that a tag having no large deterioration of the communication distance as a whole can be realized, as shown with the solid line indicated by (1a+1b) in FIG. 7B.

The maximum distance at this time is approximately 1.4 times as compared to a case when using circular polarization for the R/W antenna and linear polarization for the tag as usual. Thus, it becomes possible to expand the communication distance in the RFID system.

Figure 8:
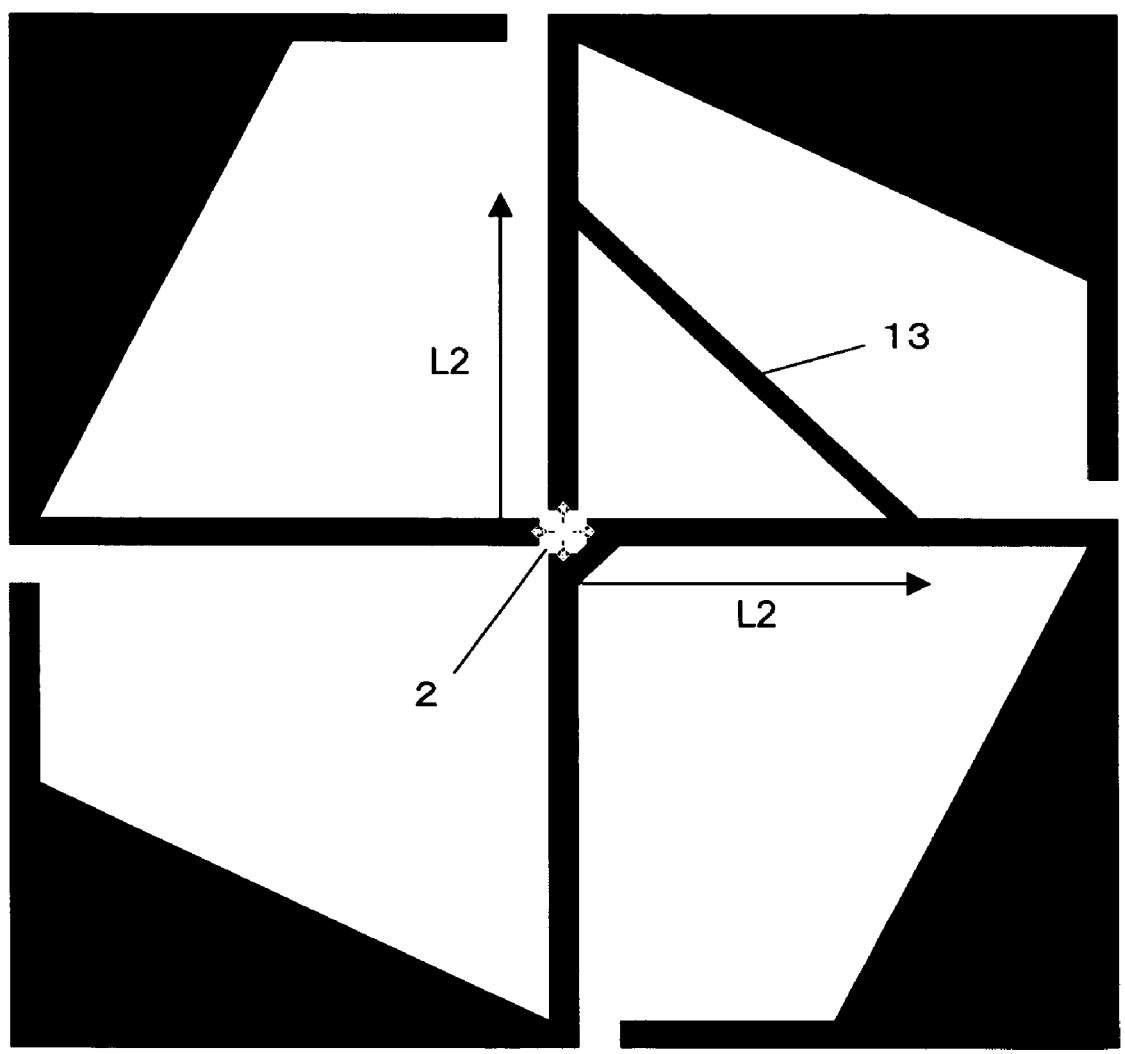
FIG. 8 shows a diagram illustrating an antenna pattern according to a second embodiment of the present invention.

FIG. 8 shows a diagram illustrating an antenna pattern according to a second embodiment of the present invention. According to the embodiment shown in FIG. 8, the configuration includes a conductive bar 13, as a method for adjusting the antenna impedance. To specify the disposition position of conductive bar 13, it is considered that conductive bar 13 is connected at a position having a distance L2 away from the mounting position of LSI chip 2, namely, the intersection center point of antennas 1a, 1b.

Figure 9:
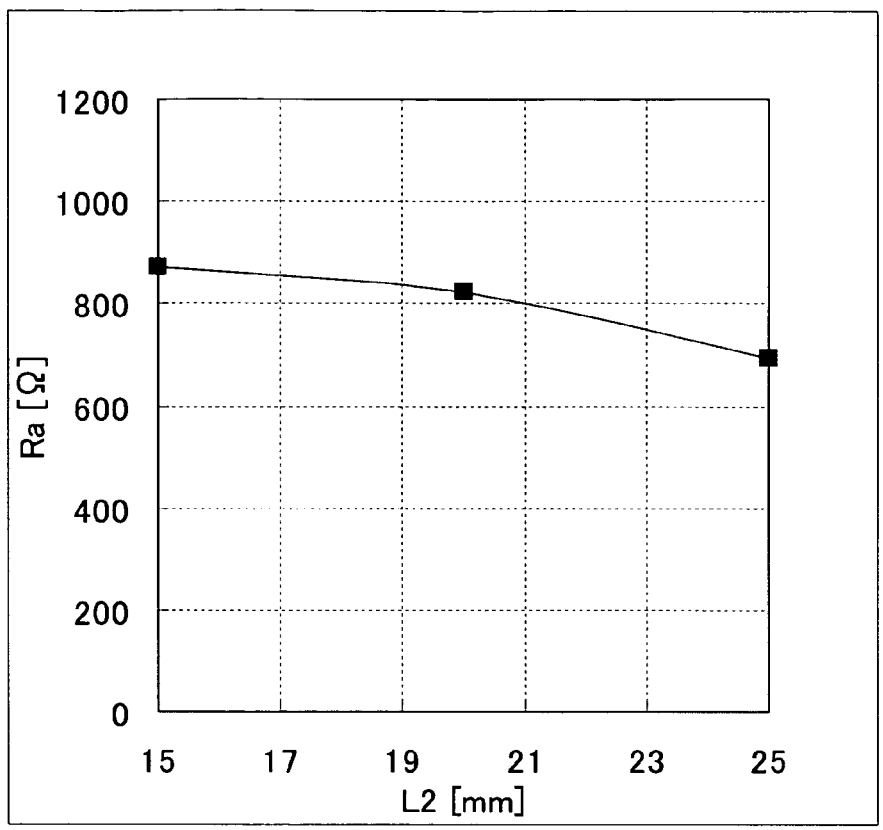
FIG. 9 shows a diagram illustrating relationship between a distance L2 of the connection point of the conductive bar and an antenna radiation resistance Ra according to the second embodiment.
Figure 10:
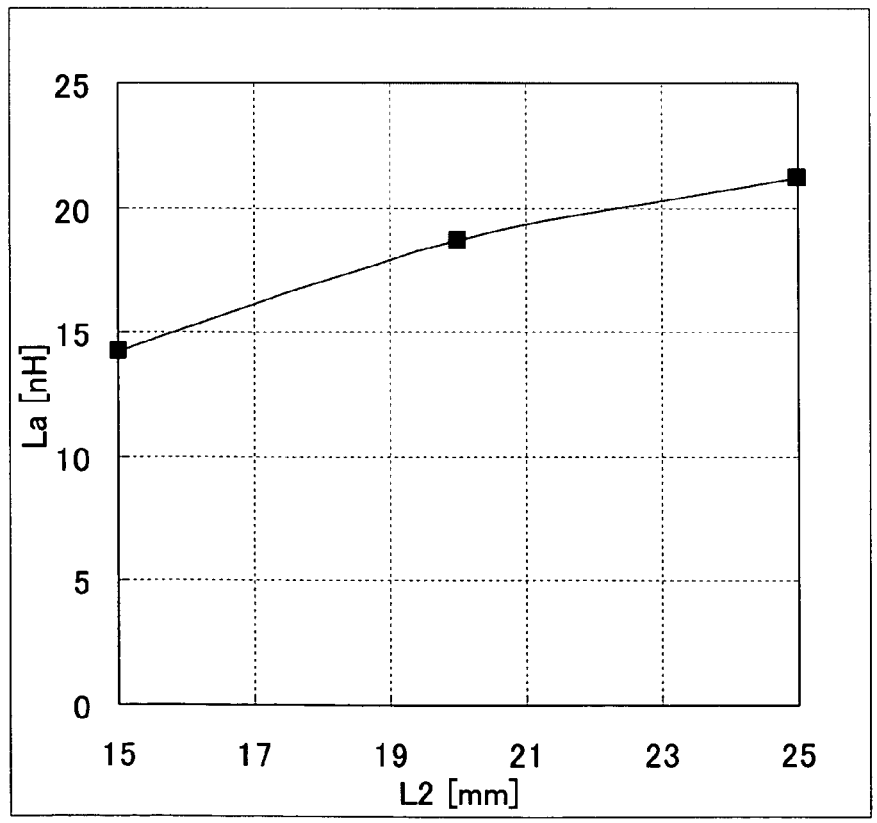
FIG. 10 shows a diagram illustrating relationship between a distance L2 of the connection point of the conductive bar and an inductance component La according to the second embodiment.

The relationships of the distance L2 of the connection point for conductive bar 13 with the antenna radiation resistance Ra, and with the inductance component La, are shown in FIGS. 9 and 10, respectively. In order to obtain the inductance La=20 nH so as to resonate with the capacitance Cc=1.4 pF of LSI chip 2 as described earlier, understandably, L2=22 mm is the optimal value.

Figure 11:
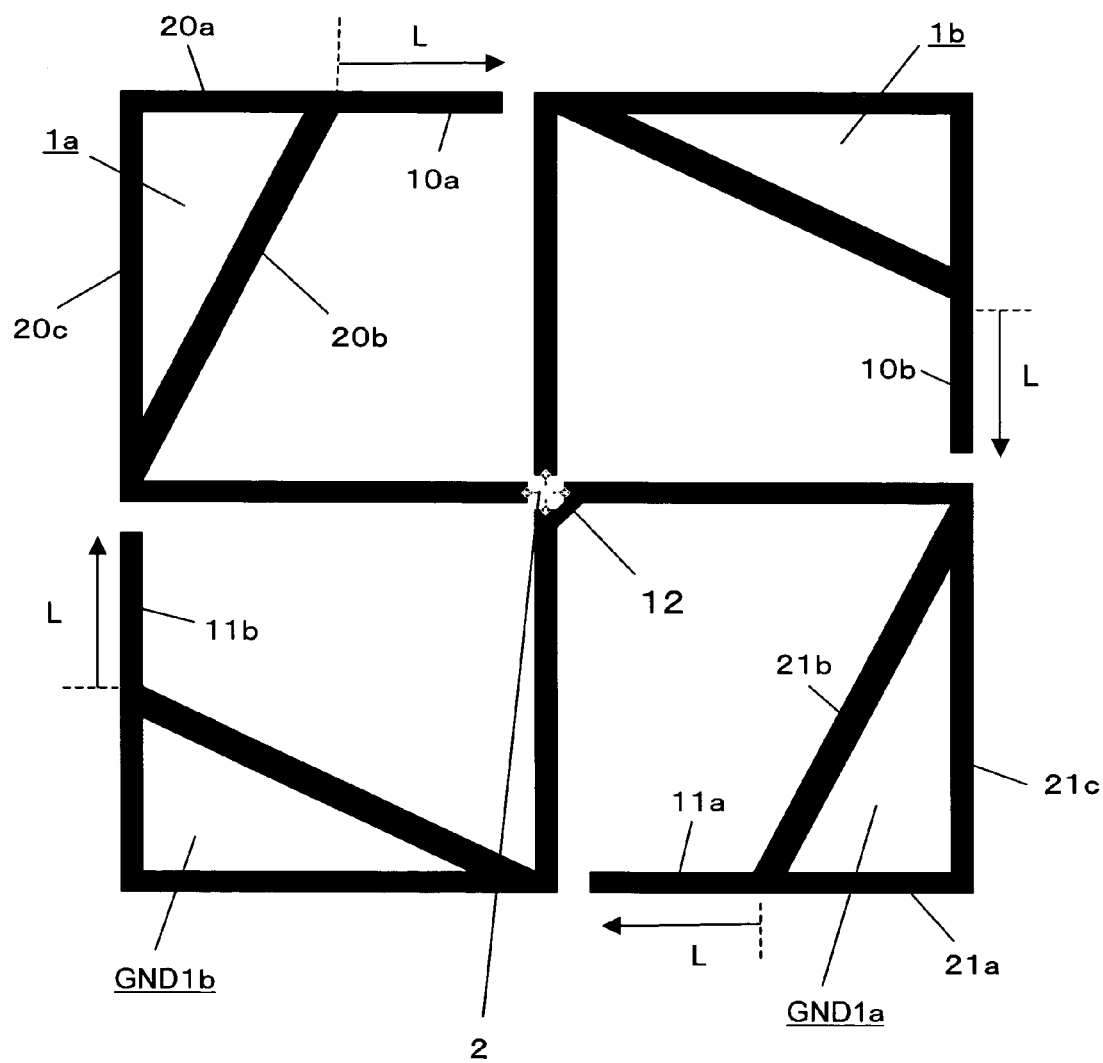
FIG. 11 shows a diagram illustrating an antenna pattern according to a third embodiment of the present invention.

FIG. 11 further shows a diagram illustrating an antenna pattern according to a third embodiment of the present invention. The current flowing in each triangle portion expanded from the respective antennas 1a, 1b is unevenly distributed into the peripheral portion of the triangle, namely, not concentrated in the vicinity of the center. Hence, it may be possible to hollow the central portion in which the current is hard to flow. When forming antennas 1a, 1b with Ag pasting as an example, the cost maybe reduced if the metal portion to be used is smaller to the possible extent.

Therefore, as shown in FIG. 11, the triangles formed at the bent portions of antennas 1a, 1b are formed of conductors 20a, 20b, 20c and 21a, 21b, 21c located at the contour portions of the triangles. Other portions are similar to the portions in the embodiment of dipole antenna 1 shown in FIG. 4.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A cross dipole antenna to be applied to an RFID system communicating information between a reader/writer and a tag using a high-frequency radio signal, the cross dipole antenna comprising:
a pair of dipole antennas having lines extending from a feed point of the pair of dipole antennas mutually intersecting crosswise; and ahead of ends bent at a right angle, of the lines, triangularly expanded lines,
wherein each total length of the pair of dipole antennas is longer than $\lambda/2$ of a use frequency $\lambda$.

2. The cross dipole antenna according to claim 1, further comprising:
extension portions disposed ahead of the respective end portions of the triangularly expanded lines of the pair of dipole antennas,
wherein the impedance is adjusted depending on the lengths of the extension portions.

3. The cross dipole antenna according to claim 2,
wherein the lengths of the extension portions are set according to the dielectric constant and the thickness of the base body having the pair of dipole antennas pasted thereon.

4. A cross dipole antenna to be applied to an RFID system communicating information between a reader/writer and a tag using a high-frequency radio signal, the cross dipole antenna comprising:
a pair of dipole antennas having lines extending from a feed point of the pair of dipole antennas mutually intersecting crosswise; and ahead of bent ends of the lines, triangularly expanded lines,
wherein each total length of the pair of dipole antennas is longer than $\lambda/2$ of a use frequency $\lambda$; and
a conductive bar connected to the respective lines extending from the feed point of the pair of dipole antennas,
wherein the impedance is adjusted depending on the connection position of the conductive bar to the lines extending from the feed point.

5. A cross dipole antenna to be applied to an RFID system communicating information between a reader/writer and a tag using a high-frequency radio signal, the cross dipole antenna comprising:
a pair of dipole antennas having lines extending from a feed point of the pair of dipole antennas mutually intersecting crosswise; and ahead of bent ends of the lines, triangularly expanded lines,
wherein each total length of the pair of dipole antennas is longer than $\lambda/2$ of a use frequency $\lambda$, and
wherein the triangle shape is formed of a peripheral contour portion of a conductor the central portion of which is hollowed.

6. A tag to be applied to an RFID system communicating information between a reader/writer and the tag using a high-frequency radio signal, the tag comprising:
a base body;
a pair of dipole antennas formed of conductors on the base body; and
an LSI chip connected to a feed point of the pair of dipole antennas mutually intersecting crosswise,
wherein the pair of dipole antennas further includes:
lines extending from a feed point of the pair of dipole antennas mutually intersecting crosswise; and
ahead of ends bent at a right angle, of the lines, triangularly expanded lines,
wherein each total length of the pair of dipole antennas is longer than $\lambda/2$ of a use frequency $\lambda$.

7. The tag to be applied to the RFID system according to claim 6,
wherein the base body is formed of PET, film or paper material, and the conductors of the dipole antennas are formed of Cu, Ag or Al.

8. The tag to be applied to the RFID system according to claim 6, further comprising:
extension portions disposed ahead of the respective end portions of the triangularly expanding lines of the pair of dipole antennas,
wherein the impedance is adjusted depending on the lengths of the extension portions.

9. The tag to be applied to the RFID system according to claim 8,
wherein the lengths of the extension portion are set according to the dielectric constant and the thickness of the base body having the pair of dipole antennas pasted thereon.

10. A tag to be applied to the RFID system communicating information between a reader/writer and the tag using a high-frequency radio signal, the tag comprising:
a base body;
a pair of dipole antennas formed of conductors on the base body; and
an LSI chip connected to a feed point of the pair of dipole antennas mutually intersecting crosswise,
wherein the pair of dipole antennas further includes:
lines extending from a feed point of the pair of dipole antennas mutually intersecting crosswise;
ahead of bent ends of the lines, triangularly expanded lines,
wherein each total length of the pair of dipole antennas is longer than $\lambda/2$ of a use frequency $\lambda$; and
a conductive bar connected to the respective lines extending from the feed point of the pair of dipole antennas,
wherein the impedance is adjusted depending on the connection position of the conductive bar to the lines extending from the feed point.

11. A tag to be applied to the RFID system communicating information between a reader/writer and the tag using a high-frequency radio signal, the tag comprising:
a base body;
a pair of dipole antennas formed of conductors on the base body; and
an LSI chip connected to a feed point of the pair of dipole antennas mutually intersecting crosswise,
wherein the pair of dipole antennas further includes:
lines extending from a feed point of the pair of dipole antennas mutually intersecting crosswise;
ahead of bent ends of the lines, triangularly expanded lines,
wherein each total length of the pair of dipole antennas is longer than $\lambda/2$ of a use frequency $\lambda$; and
wherein the triangle shape is formed of a peripheral contour portion of a conductor the central portion of which is hollowed.

* * * * *